(12) United States Patent
Ishida et al.

(10) Patent No.: US 8,349,245 B2
(45) Date of Patent: Jan. 8, 2013

(54) VEHICLE INTERIOR PANEL AND PRODUCING METHOD THEREOF

(75) Inventors: Ryuichi Ishida, Kanagawa (JP); Ryosuke Oki, Kanagawa (JP); Teruo Tamada, Kanagawa (JP)

(73) Assignee: Kyoraku Co., Ltd., Tokyo (JP)

( * ) Notice: Subject to any disclaimer, the term of this patent is extended or adjusted under 35 U.S.C. 154(b) by 37 days.

(21) Appl. No.: 13/184,920

(22) Filed: Jul. 18, 2011

(65) Prior Publication Data
US 2011/0315311 A1  Dec. 29, 2011

Related U.S. Application Data

(62) Division of application No. 11/579,018, filed as application No. PCT/JP2005/008556 on Apr. 28, 2005, now abandoned.

(30) Foreign Application Priority Data

Apr. 30, 2004  (JP) ................... 2004-136462
May 31, 2004  (JP) ................... 2004-160790
Nov. 30, 2004  (JP) ................... 2004-346189

(51) Int. Cl.
*B29C 43/30*  (2006.01)
(52) U.S. Cl. ...................... 264/516; 264/257
(58) Field of Classification Search .......... 264/257, 264/516
See application file for complete search history.

(56) References Cited

U.S. PATENT DOCUMENTS

| 4,324,541 | A  | 4/1982  | Curetti et al. |
| 4,636,065 | A  | 1/1987  | Kanemitsu et al. |
| 5,037,285 | A  | 8/1991  | Kudert et al. |
| 6,086,145 | A  | 7/2000  | Wandyez |
| 6,413,348 | B2 | 7/2002  | Stancu et al. |
| 6,743,504 | B1 | 6/2004  | Allen et al. |
| 6,749,794 | B2 | 6/2004  | Spengler |
| 6,936,321 | B2 | 8/2005  | Moran et al. |
| 6,988,305 | B1 | 1/2006  | Wilson |
| 7,291,307 | B2 | 11/2007 | Moran et al. |

(Continued)

FOREIGN PATENT DOCUMENTS

JP  62-255117  11/1987

(Continued)

OTHER PUBLICATIONS

PCT Search Report dated Jul. 13, 2005 of Patent Application No. PCT/JP2005/008556 filed on Apr. 28, 2005.

(Continued)

*Primary Examiner* — Christina Johnson
*Assistant Examiner* — Saeed Huda
(74) *Attorney, Agent, or Firm* — Maine Cernota & Rardin

(57) ABSTRACT

A method of producing a vehicle interior panel having a hollow double-walled structure made of thermoplastic comprising, blow molding with a pair of mold halves including a first mold with a shape transfer surface having a three dimensional pattern, and a second mold, clamping a cover material being formed by at least a double-layer structure arranged between a cavity of said first mold and a parison of thermoplastic such that a resin sheet layer without a through hole and without a three dimensional pattern faces a cavity of said first mold, introducing a pressurized fluid into the parison to press the cover material and the parison against a cavity surface, thereby integrally laminating said cover material to an outer surface of a first wall of the panel having the hollow double-walled structure and transferring said three dimensional pattern of said first mold half to said resin sheet.

8 Claims, 12 Drawing Sheets

U.S. PATENT DOCUMENTS

| | | |
|---|---|---|
| 2002/0011695 A1 | 1/2002 | Stancu et al. |
| 2003/0197302 A1 | 10/2003 | Kakarala et al. |
| 2003/0203150 A1 | 10/2003 | Moran et al. |
| 2007/0203300 A1 | 8/2007 | Sumi et al. |

FOREIGN PATENT DOCUMENTS

| | | |
|---|---|---|
| JP | 63-092431 | 4/1988 |
| JP | 64-034720 | 2/1989 |
| JP | 06-143394 | 5/1994 |
| JP | 06-147623 | 5/1994 |
| JP | 08-118459 | 5/1996 |
| JP | 09-039078 | 2/1997 |
| JP | 09-039079 | 2/1997 |
| JP | 10-235720 | 9/1998 |
| JP | 2000-084973 | 3/2000 |
| JP | 2000-289095 | 10/2000 |
| JP | 2001-277342 | 10/2001 |
| JP | 2002-046540 | 2/2002 |
| JP | 2003-291207 | 10/2003 |
| JP | 2004-074660 | 3/2004 |
| WO | 20060437303 | 4/2006 |
| WO | 2006106933 | 10/2006 |
| WO | 2006129730 | 12/2006 |

OTHER PUBLICATIONS

"Testing Method for Tensile Properties of Plastics", JIS Handbook, Jun. 30, 1995.

Office Action dated Apr. 29, 2009 for U.S. Appl. No. 11/579,018, filed Oct. 31, 2007, 31 pgs.

Office Action dated Feb. 1, 2010 for U.S. Appl. No. 11/579,018, filed Oct. 31, 2007, 7 pgs.

Office Action dated May 25, 2010 for U.S. Appl. No. 11/579,018, filed Oct. 31, 2007, 17 pgs.

Office Action dated Nov. 9, 2010 for U.S. Appl. No. 11/579,018, filed Oct. 31, 2007, 16 pgs.

Office Action dated Mar. 18, 2011 for U.S. Appl. No. 11/579,018, filed Oct. 31, 2007, 17 pgs.

VEHICLE INTERIOR PANEL AND PRODUCING METHOD THEREOF

RELATED APPLICATIONS

This application is a divisional of U.S. patent application Ser. No. 11/579,018, filed Oct. 31, 2007 entitled "Interior Finishing Panel for Vehicle and Method of Manufacturing the Same", which is a US National Phase Application of PCT/JP2005/008556, filed Apr. 28, 2005 which claims priority to JP 2004-136462, filed Apr. 30, 2004 and JP 2004-160790, filed May 31, 2004 and JP 2004-346189, filed Nov. 30, 2004. Each of these applications is herein incorporated by reference in their entirety for all purposes.

TECHNICAL FIELD

The present invention relates to a blow-molded panel with skin which is used as a vehicle interior panel, a method of producing the panel with skin, and a laminating blow molding method. The panel with skin is the vehicle interior panel used for a lid panel, a shelf board, and the like of a luggage compartment in an automobile such as a floor panel, a luggage board, and a shelf panel. And the panel with skin is also the panel having a hollow double-walled structure in which a cover material is integrally laminated by the blow molding. The cover material is one in which a non-woven fabric is laminated to a resin sheet. The resin sheet is made of a thermoplastic resin, and a three-dimensional pattern is formed on the resin sheet.

BACKGROUND

In the lid panel and the like of the luggage compartment in an automobile such as the floor panel and the luggage board, the panel in which the cover material such as the non-woven fabric is laminated to the panel surface is used in order to improve touch sense of the panel surface and to impart a design effect (see Japanese Patent Laid-Open No. H1-347720 and Japanese Patent Laid-Open No. 2000-289095). However, recently utilization of the luggage compartment and the like of the automobile is diversified, accordingly demands for the panel formed by the integrally welded resin sheet in which the three-dimensional pattern such as a grain pattern is formed and the like are grown besides the conventional panel in which the non-woven fabric is laminated.

For example, Japanese Patent Laid-Open No. H9-39078 discloses one in which a decorative fabric having a three-layer structure of the cover material, a foam, and a fabric sheet, integrally laminated to a surface wall of a upholstered hollow molding component (panel) while blow molding and the fabric sheet is the non-woven fabric whose weight per area ranges from 50 to 250 g/m². Japanese Patent Laid-Open No. H9-39079 discloses one in which the cover material, which is formed by the bonding of a resin sheet and a fabric sheet, is integrally laminated to the surface wall of the upholstered hollow molding component (panel) while blow molding and the resin sheet is made of polypropylene or PET whose tensile modulus ranges from 3000 to 12000 kg/cm².

Japanese Patent Laid-Open No. S62-25117 discloses a molding method, in which a coating layer (cover material) is heated and integrally laminated while blow molding, the cover material is formed by bonding a non-woven fabric to a soft PVC, and a not-flat pattern of a mold is transferred. Japanese Patent Laid-Open No. H10-235720 discloses a panel with skin, to which a fabric having fuzzy hairs (non-woven fabric) is integrally laminated, used for a vehicle cargo floor panel and the like, and the panel with skin has an double-walled rib. Japanese Patent Laid-Open No. 2001-277342 and Japanese Patent Laid-Open No. 2004-74660 disclose that a part of a parison is compressed and thinned to form a hinge portion having a groove while blow molding and the non-woven fabric is placed between the cover material and the parison from the viewpoint of improving cover material bonding strength.

In the panel with skin produced by the blow molding is formed by integrally laminating a cover material to a melted parison while molding. In the case where the resin sheet having no air permeability is used as the cover material, there is a problem that air remains between the resin sheet and parison arranged in the mold. In order to prevent the above problem, usually a resin sheet in which the foam or the non-woven fabric is placed is used.

In the vehicle interior panel and the like, it is desired that the not-flat three-dimensional pattern such as the fine grain pattern or a regular embossing pattern emerges on the outer surface of the cover material. However, when the blow molding is performed with a resin sheet having a not-flat three-dimensional pattern, the not-flat three-dimensional pattern becomes flat by pressure while blow molding and heat from the parison, which results in deformation of the resin sheet. Further, particularly in an end portion of the resin sheet, the not-flat three-dimensional pattern is largely elongated by stretch of the resin sheet, and appearance is remarkably detracted.

A not-flat three-dimensional pattern along the cavity of the mold can be transferred as a method of causing the not-flat three-dimensional pattern to appear on the outer surface of the cover material. However, the resin sheet, in which the foam or the non-woven fabric is placed, is usually thick, three-dimensional pattern along the cavity of the mold cannot be transferred sufficiently. Particularly, in the case where the resin sheet is not previously softened by heating from the viewpoint of moldability, there is problem that the three-dimensional pattern having the good appearance cannot be reproduced.

In the vehicle interior panel, a rib, which is protruded from a backside wall and integrally welded to the backside of the surface wall, is formed in order to enhance rigidity of a hollow double-walled structure, or a thin hinge portion, in which the surface wall and the backside wall are integrally welded, is formed in order to partially open and close divided floor boxes when the vehicle interior panel is used as a lid of the floor box. In this case, because the rib or the hinge portion is formed by integrally welding the surface wall and the backside wall, sink marks and unevenness of the transfer ability are generated in the three-dimensional pattern appearing on the surface of the resin sheet by a difference of molding condition between the welded portion and a portion corresponding to a hollow space where the surface wall and the backside wall are not welded. As a result, because the transfer is partially insufficient, there is the problem that the appearance is detracted by becoming dim or flatting of the three-dimensional pattern.

In the panel with skin produced by the blow molding, there is a problem that peeling of the cover material is easy to occur at the end of the sheet and the hinge portion. Therefore, in order to prevent the peeling and uplift of the cover material, it is necessary to take such countermeasures such as molding the cover material integrally by winding the end of the cover material in the backside of the panel with a slide mold, and forming a wide recess from the cover material side in the hinge portion to broaden a bonding area.

BRIEF SUMMARY OF THE INVENTION

Therefore, according to the invention, in a vehicle interior panel having a hollow double-walled structure including a peripheral wall which forms a hollow space between a first wall and a second wall, a cover material laminated to the first wall is formed by at least a double-layer structure in which a non-woven fabric whose weight per area ranges from 80 to 250 g/m$^2$ is bonded to the resin sheet, an average thickness of the cover material is no more than 2.0 mm, tensile modulus of the cover material being no more than 3500 kg/cm$^2$ at room temperature, and an end of the cover material is fixed along a parting line formed over a substantially entire circumference of the peripheral wall. Accordingly, even when laminating the resin sheet having a three-dimensional pattern with projections, recesses, or projections and recesses on a surface thereof integrally by blow molding, the three-dimensional pattern does not become flat nor is deformed by the pressure while blow molding and heat from the parison, and the deformation caused by largely elongating the three-dimensional pattern is not generated at the end of the resin sheet. Further, according to the invention, when the three-dimensional pattern including a fine grain pattern or a regular embossing shape is transferred from a cavity of a mold to a surface of a resin sheet while blow molding, the transfer ability are sufficiently high, and the three-dimensional pattern having good appearance can be emerged on the surface of the cover material.

In the vehicle interior panel having the hollow double-walled structure, the parting line is formed at a position located within a 35% range of the average thickness of the panel from the surface of the first wall, a step portion is formed over the substantially entire circumference at a portion on the first wall side of the parting line of the peripheral wall, and the end of the cover material laminated to the surface of the first wall while blow molding is laminated along the step portion. Therefore, the three-dimensional pattern having the good appearance can be emerged, the excessive elongation of the end of the cover material laminated to the surface of the first wall of the panel is suppressed, and the cover material is strongly fixed to the surface of the first wall without generating the wrinkle and breakage, which allows the detraction of appearance and the peeling of the end to be prevented.

In the case where a thin hinge portion is integrally formed, the first wall can substantially be formed in flat by forming the parting line with a substantially linear portion and a portion close to the first wall side in the vicinity of the hinge portion (parting surfaces of the mold halves forming the parting line are formed at the positions close to the cavity surface on the cover material arrangement side by winding the parting line of the mold at the position corresponding to the hinge portion). Therefore, the sheet peeling caused by motion of the hinge portion is prevented, and the unevenness of the transfer ability is not generated even if the three-dimensional pattern is transferred to the surface of the cover material.

Further, double-walled ribs having the plate-like structures are formed as a reinforcement rib in which a part of the second wall being protruded toward the first wall to be integrally welded to the backside of the first wall. Therefore, the detraction of the appearance caused by the sink marks or the like is not generated, and the unevenness is not generated in the surface of the cover material, and the three-dimensional pattern having the good appearance can be emerged.

According to the invention, the vehicle interior panel having the hollow double-walled structure in which the three-dimensional pattern is preferably emerged on the surface of the cover material can be obtained by using the thin, soft sheet having at least the double-layer structure in which the non-woven fabric whose weight per area ranges from 80 to 250 g/m$^2$ is placed as the cover material between the resin sheet and the first wall.

A step portion, an double-walled rib, and a parting line are provided, and a three-dimensional pattern including the projections, the recesses, or the projections and recesses emerge is formed on the surface of the resin sheet by the three-dimensional shape transfer surface provided in the cavity of the mold. The step portion is formed over the substantially entire circumference at a portion on the first wall side of the parting line formed on the peripheral wall, the double-walled rib is formed between the first wall and the second wall, a part of the second wall is protruded toward the first wall to be integrally welded to the backside of the first wall and the protruded portions is integrally welded to each other, and the parting line is formed by the substantially linear portion and the portion close to the first wall side in the vicinity of the hinge portion the peripheral wall of the hollow double-walled structure. Therefore, there are effects that the excessive elongation of the end of the cover material is suppressed, the cover material is strongly fixed without generating the wrinkle and breakage, the three-dimensional pattern having the fine grain pattern or the regular embossing shape cab preferably is emerged, the unevenness of the transfer ability caused by the sink marks of the like is not generated, and the detraction of the appearance can be prevented.

DETAILED DESCRIPTION

The invention will be described in detail with reference to the accompanying drawings.

Figure 1:
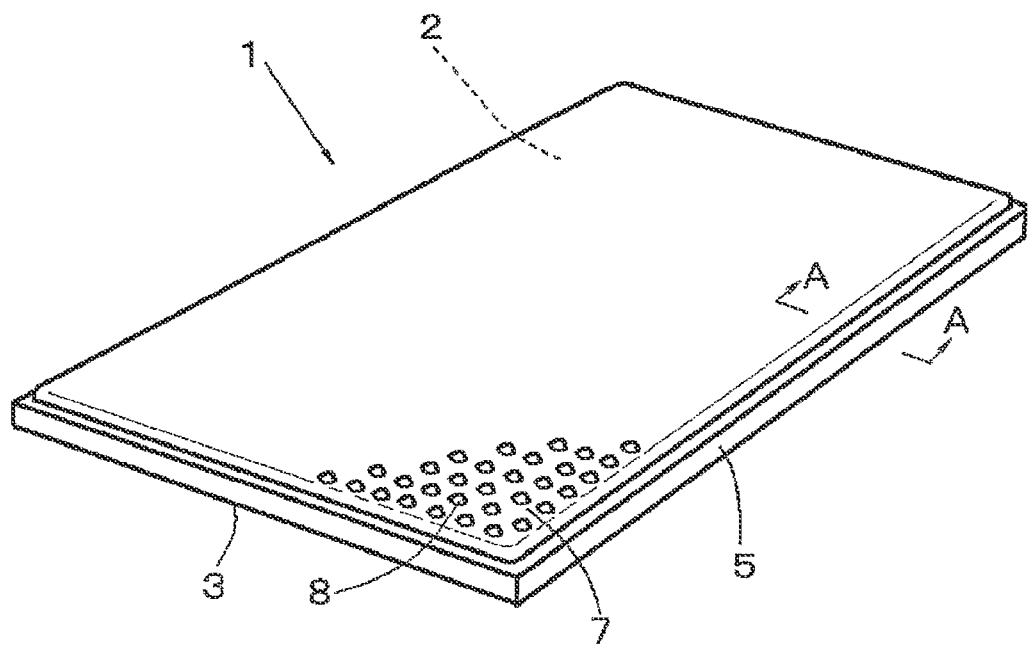
FIG. 1 is a perspective view of a vehicle interior panel according to the invention.
Figure 2:
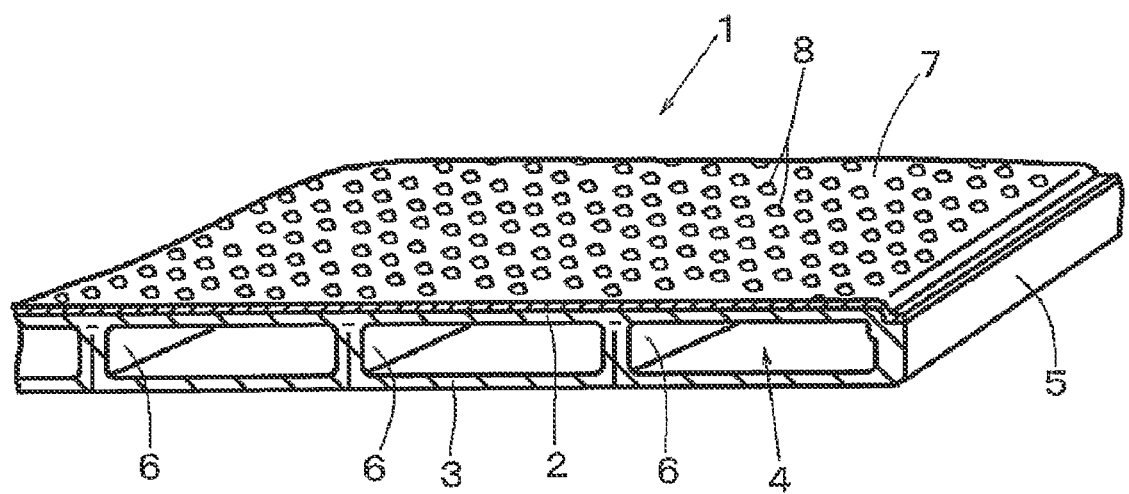
FIG. 2 is a sectional view taken on line A-A of FIG. 1.
Figure 3:
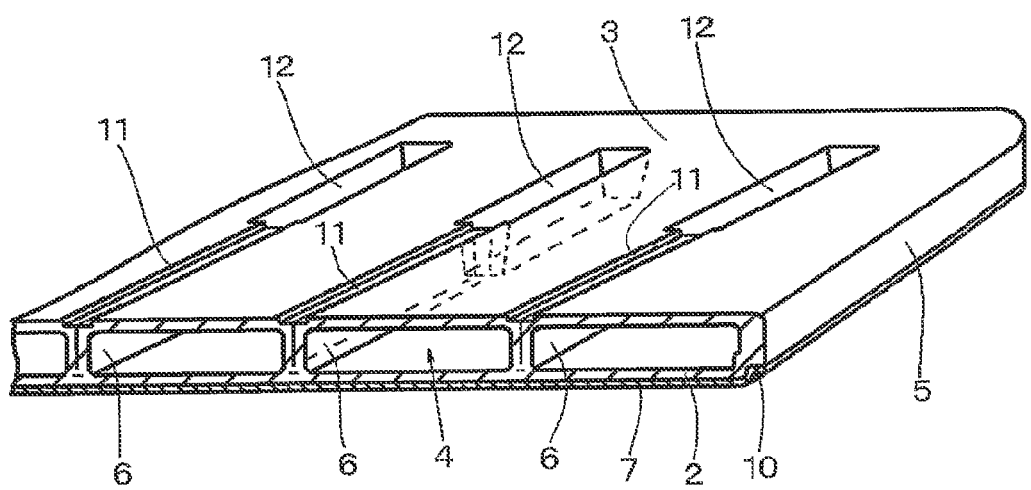
FIG. 3 is a partially perspective view of the vehicle interior panel of FIG. 1 when viewed from backside.
Figure 4:
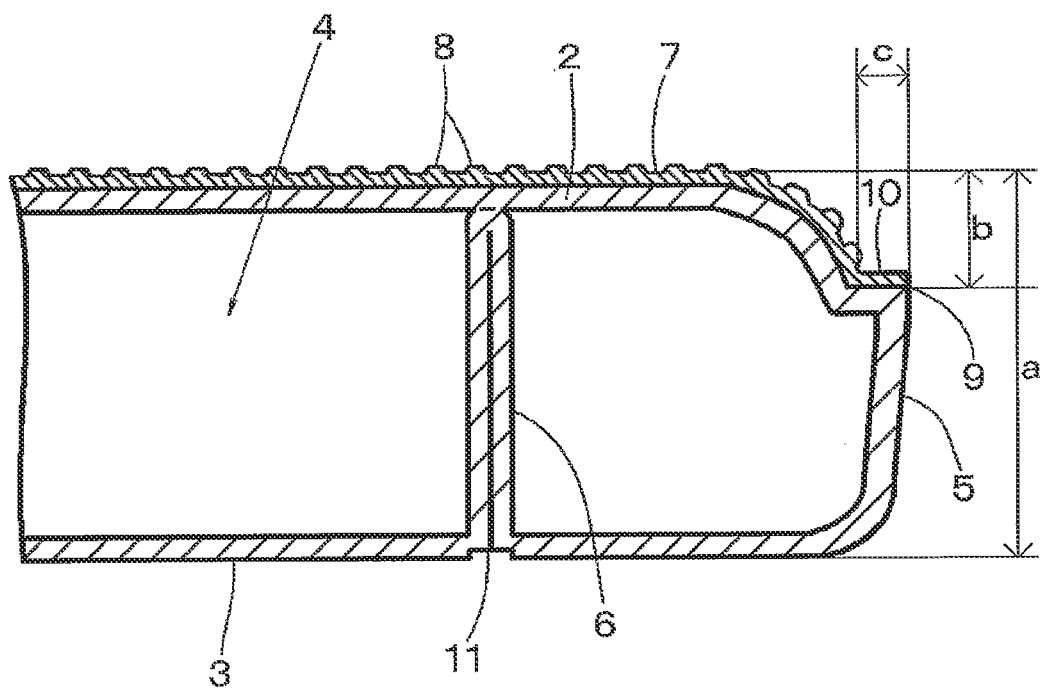
FIG. 4 is a partially enlarged sectional view showing the vehicle interior panel.

FIG. 1 is a perspective view of a vehicle interior panel according to the invention, FIG. 2 is a sectional view taken on line A-A of FIG. 1, FIG. 3 is a partially perspective view of the vehicle interior panel of FIG. 1 when viewed from backside, and FIG. 4 is a partially enlarged sectional view showing the vehicle interior panel.

In FIGS. 1 to 4, the reference numeral 1 designates a vehicle interior panel. The vehicle interior panel 1 has a hollow double-walled structure made of a thermoplastic resin by blow molding, and the vehicle interior panel 1 has a first wall 2 and a second wall 3 which face each other with some intervals. The vehicle interior panel 1 has a peripheral wall 5 between the first wall 2 and the second wall 3, and the peripheral wall 5 forms a hollow space 4. Double-walled ribs 6 having plate-like structures are formed between the first wall 2 and the second wall 3. The double-walled rib 6 is formed as follows, a part of the second wall 3 is protruded toward the first wall 2 to be integrally welded to the backside of the first wall 2, a wall surface of the protruded portion is folded into two wall surfaces, and the two wall surfaces are integrally welded.

A cover material 7 whose average thickness ranges from 0.5 to 3.0 mm is integrally laminated to the first wall 2. It is particularly preferable that the cover material 7 has a double-layer structure in which non-woven fabric whose weight per area is no more than 250 g/m$^2$ is bonded to the resin sheet. A three-dimensional pattern 8 emerges on the surface of the resin sheet. The thickness of the resin sheet itself ranges from about 0.2 to 0.6 mm.

The resin sheet forming the cover material 7 is made of a thermoplastic resin including thermoplastic elastomer (TPE) such as polyvinyl chloride (PVC), thermoplastic polyurethane elastomer (TPU), and thermoplastic polyolefin elastomer (TPO) and a polyolefin resin such as a polyethylene resin and a polypropylene resin. The resin sheet in which a fabric sheet such as a non-woven fabric is laminated to the backside is used for the purpose of adhesive properties and prevention of an air pool. Olefin elastomer (TPO), urethane elastomer (TPU), styrene elastomer (SBC), polyvinyl chloride (TPVC), polyester elastomer (TPEE), polyamide elastomer (TPAE) and the like can appropriately be selected as thermoplastic elastomer. Among them, from the viewpoint of transfer ability for forming the three-dimensional pattern, thermoplastic polyurethane elastomer (TPU) or thermoplastic polyolefin elastomer (TPO) are preferable for the resin sheet.

A through hole is not made in the resin sheet. The resin sheet is made of the thermoplastic resin. For the thermoplastic resin, tensile modulus is no more than 3500 kg/cm$^2$ at room temperature and more preferably tensile modulus is 2000 kg/cm$^2$, tensile modulus is lower than 500 kg/cm$^2$ at 100° C. and more preferably tensile modulus is lower than 300 kg/cm$^2$, and a tensile strength at yield point is no more than 50 kg/cm$^2$ at 100° C. In this case, tensile modulus and the tensile strength at yield point (tensile yield strength) are measured pursuant to JIS-K-7113. No. 2 specimens are used as a specimen, and the measurement is performed at a test speed of 50 mm/min. However, an environmental temperature is set at room temperature (23° C.) or 100° C., and the measurement is performed after the temperature of the specimen is stabilized.

To provide the three-dimensional pattern 8, it is preferable that a pattern of the cavity surface is transferred to the surface of the resin sheet by pressing the cover material 7 against the mold while blow molding. Further, the cover material 7 in which a design or pattern improving appearance or touch sense, or a grain pattern is previously formed on the surface of the resin sheet can be used.

The three-dimensional pattern 8 emerging on the surface of the resin sheet is formed in plural not-flat shapes having height at least 200 µm, preferably ranging from 500 to 2500 µm. Examples of the three-dimensional pattern 8 preferably include the grain pattern such as satin-like finish, tanned skin-like finish, a geometrical pattern, a wood-grain pattern, and a marble-grain pattern and an embossing pattern protruded in a hemispherical shape, a tubular shape, a conical shape, a cylindrical shape, a square-pole shape, and a trapezoidal shape.

As shown in FIG. 4, the vehicle interior panel 1 is formed while an average thickness (a) of the vehicle interior panel 1 ranges from 20.0 to 40.0 mm. On the peripheral wall 5 connecting the first wall 2 and the second wall 3, a parting line 9 is formed at a position located within a 35% range (b) of the average thickness of the panel from the surface of the first wall 2, or the parting line 9 is formed within the range in which the thickness is no more than 8.0 mm from the surface of the first wall 2. The parting line 9 is formed over the entire circumference of the peripheral wall 5. When the parting line 9 is formed at the position far away from the surface of the first wall 2 to which the cover material 7 is laminated integrally, an edge of the cover material is prolonged. Therefore, it is necessary that the parting-line forming position is close to the surface of the first wall 2 to an extent so that the edge of the cover material is not prolonged. A step portion 10 having a width c is substantially formed over the circumference on the side of the first wall 2 of the parting line 9, and the edge of the cover material 7 is laminated along the step portion 10. The width c of the step portion 10 is at least 1.0 mm, and preferably the width c is at least 1.5 mm. Although the width c of the step portion 10 is set at least 1.0 mm, the width c can appropriately be adjusted according to the thickness of the cover material 7. When the width c of the step portion 10 is lower than 1.0 mm, welding strength is not sufficient at the edge of the cover material 7, peeling is easy to occur at the edge of the cover material 7, and workability of flash removal is worsened.

A boundary portion between the first wall 2 and the step portion 10 is formed on a loose curved surface, and elongation is hardly generated in the edge portion of the cover material 7 while the edge portion of the cover material 7 is welded to the step portion 10. Therefore, even if the grain pattern is formed in the surface of the cover material 7, not only the appearance of the cover material 7 is not detracted, but also the peeling is hardly generated in the welded portion because the elongation is hardly generated in the edge portion of the cover material 7 while the edge portion of the cover material 7 is welded to the step portion 10.

The double-walled rib 6 has the plate-like structure, in which a part of the second wall 3 is protruded toward the first wall 2 to be integrally welded to the inner surface of the first wall 2, the protruded wall surface is folded into two wall surfaces, and the two wall surfaces are integrally welded. The shape such as a recess caused by the double-walled rib 6 never emerges on the appearance of the vehicle interior panel 1. In the case where the double-walled rib 6 is formed, only one stripe emerges on the surface of the second wall 3 by a fold thickness generated in the portion where the two wall surfaces is folded and welded. Form the viewpoint of causing the stripe generated by the double-walled rib 6 to be inconspicuous in appearance, and from the viewpoint of preventing the micro protrusion generated by the stripe from projecting to the surface of the second wall 3, a groove 11 which is shallower than the thickness of the wall surface of the second wall 3 is formed on the surface of the second wall 3 such that the stripe corresponding to the region where the double-walled rib 6 is formed is concaved from the surface of the second wall 3. In the vehicle interior panel 1, a series of weld ribs 12 is provided at an end portion in a longitudinal direction of the double-walled rib 6. In the weld rib 12, a part of the second wall 3 is protruded toward the first wall 2 to be integrally welded to the backside of the first wall 2, and the protruded portion is formed in the concave shape.

Figure 5:
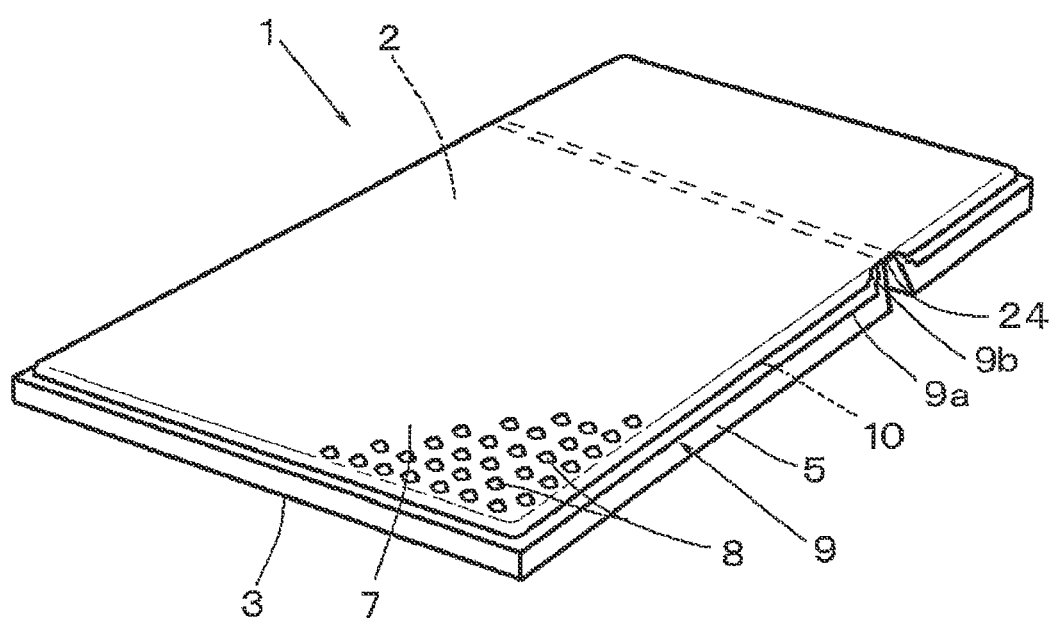
FIG. 5 is a perspective view of a vehicle interior panel according to another embodiment of the invention.
Figure 6:
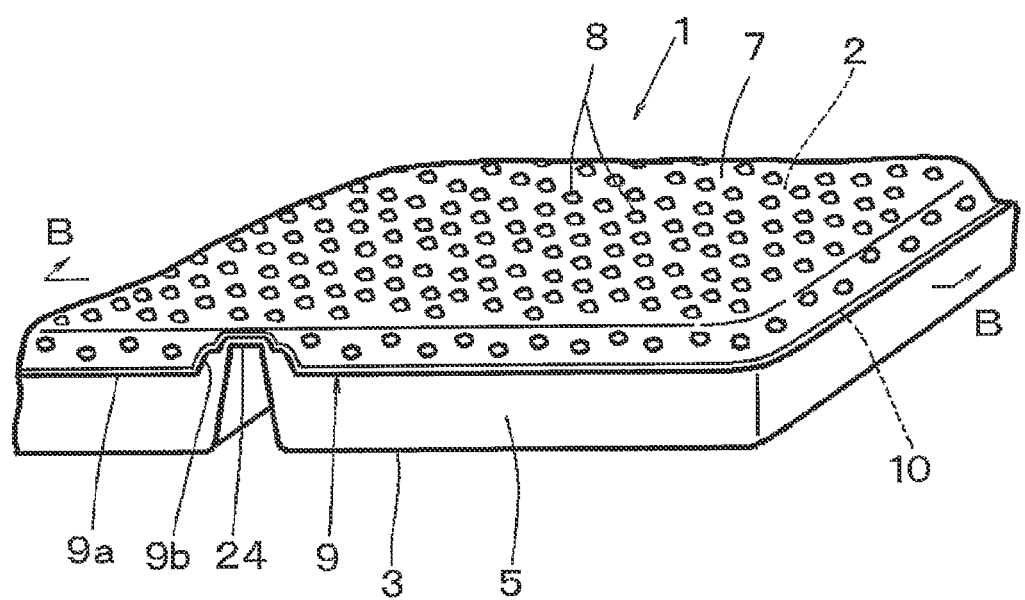
FIG. 6 is a partially detail perspective view of FIG. 5.
Figure 7:
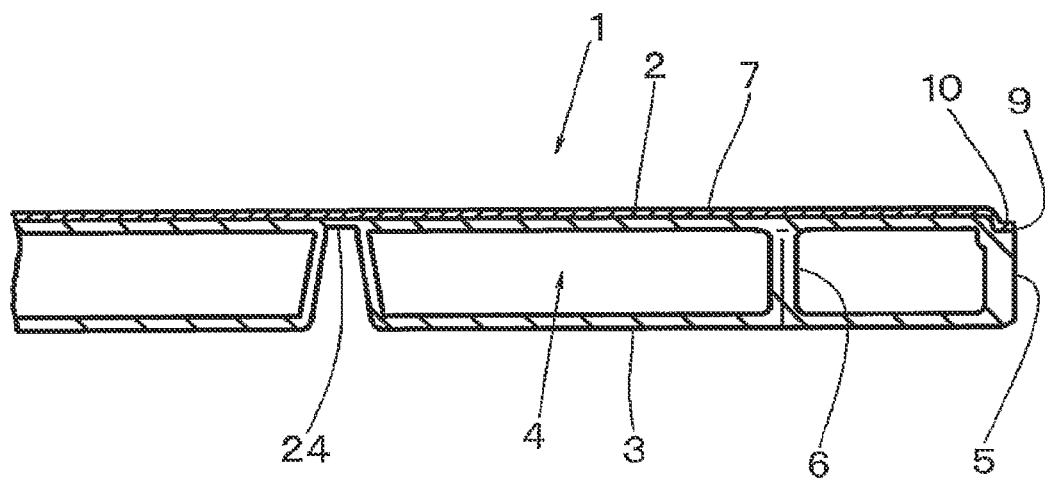
FIG. 7 is a sectional view taken on line B-B of FIG. 6.

Another embodiment of the invention will be described with reference to FIGS. 5 to 7. However, the same mode as FIGS. 1 to 4 is designated by the same reference numeral, and the description of the same mode will not be repeated. FIG. 5 is a perspective view of a vehicle interior panel according to another embodiment of the invention, FIG. 6 is a partially detail perspective view of FIG. 5, and FIG. 7 is a sectional view taken on line B-B of FIG. 6.

A linear hinge portion 24 separating the hollow spaces 4 can be formed in the vehicle interior panel 1. In the hinge portion 24, a part of the second wall 3 is protruded toward the first wall 2 and integrally welded to the backside of the first wall 2. The parting line 9 is formed on the peripheral wall 5 connecting the first wall 2 and the second wall 3. The hinge portion 24 has a linear thin single-wall structure in which the first wall 2 and the second wall 3 are welded to each other, and a part of the panel can be opened and closed through the hinge portion 24. The parting line 9 includes a substantially linear portion 9a and a portion 9b. The portion 9b is located close to the side of the first wall 2 in the vicinity of the hinge portion 24. The first wall 2 is substantially formed in flat, and the hinge portion 24 is formed in the substantially same surface as the first wall 2. Therefore, there is no recess such as the groove in the first wall 2 at the position corresponding to the hinge portion 24, and rattle or catching is not generated when a baggage and the like are placed on the vehicle interior panel 1. Further, when the three-dimensional pattern is transferred by the mold, the vehicle interior panel 1 having the good appearance can be obtained while deformation such as elongation and surface irregularity is not generated in the three-dimensional pattern.

The plural double-walled ribs 6 are formed in parallel with the hinge portion 24, and both ends of the double-walled rib 6 extending in parallel with the hinge portion 24 are formed while spaced from the peripheral wall 5. The hollow space 4 is not separated by the double-walled rib 6, but the hollow space 4 is separated only by the hinge portion 24. Therefore, because the hollow spaces 4 communicating one another are filled with a pressurized fluid while blow molding since the pressurized fluid is not obstructed by the double-walled ribs 6, the provision of at least two blow nozzles is enough to introduce the pressurized fluid into a parison. Further, the double-walled ribs 6 can intermittently be formed in order to fill the parison with the pressurized fluid. That is, the double-walled rib 6, linearly formed from one end of the peripheral wall 5 toward the other end, can be formed by dividing the double-walled rib 6, so that the pressurized fluid can flow through gaps between the double-walled ribs 6.

Figure 8:
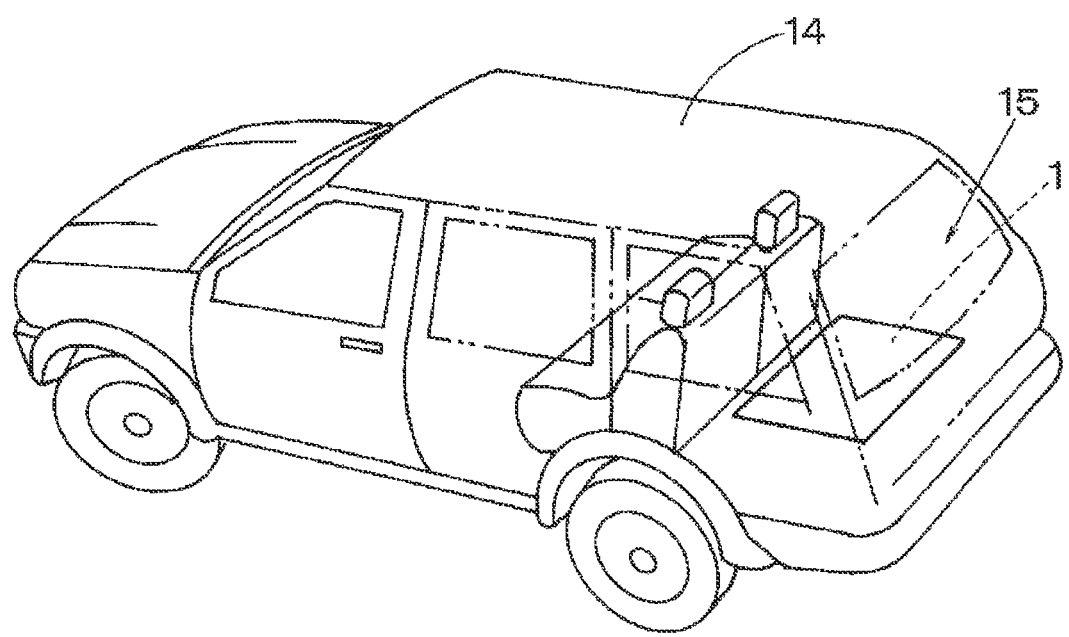
FIG. 8 is a perspective view showing a mode in which an automobile is equipped with a floor panel which is of an example of the vehicle interior panel according to the invention.

FIG. 8 is a perspective view showing a mode in which the automobile is equipped with a floor panel which is of an example of the vehicle interior panel according to the invention. The vehicle interior panel 1 illustrated in FIGS. 1 to 7 is an automobile floor panel 13, and the floor panel 13 is furnished in a luggage compartment 15 of an automobile 14 as shown in FIG. 8.

Any thermoplastic resin in which the blow molding can be performed is used as the thermoplastic resin of which the vehicle interior panel 1 is made. Examples of the thermoplastic resin include polyolefin resins such as a polyethylene resin, and a polypropylene resin, a polyvinyl chloride resin, an ABS resin (acrylonitrile-butadiene-styrene resin), a polyamide resin, a polystyrene resin, a polyester resin, polycarbonate resin, engineering plastics such as modified polyphenylene ether and a mixture thereof. Fillers such as glass fiber, carbon fiber, calcium carbonate, talc, and mica can be added as appropriate.

Figure 9:
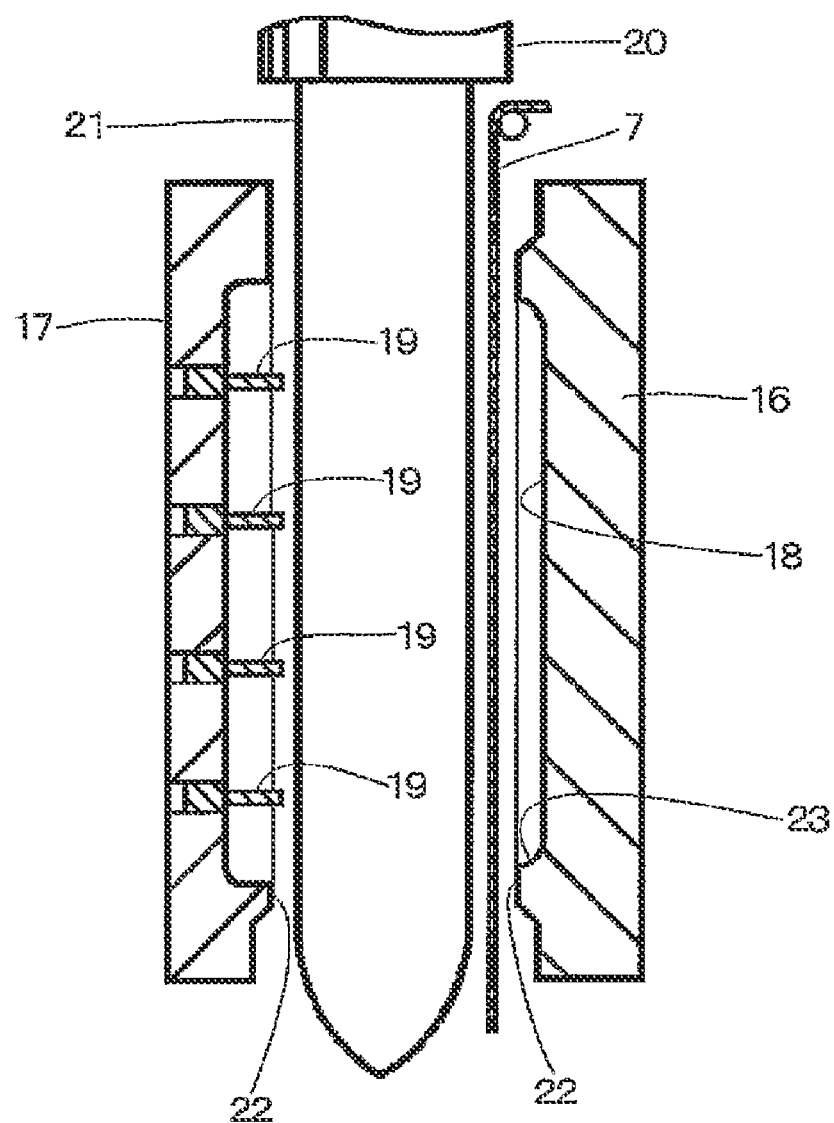
FIG. 9 is a sectional view showing a blow molding mode of the vehicle interior panel.
Figure 10:
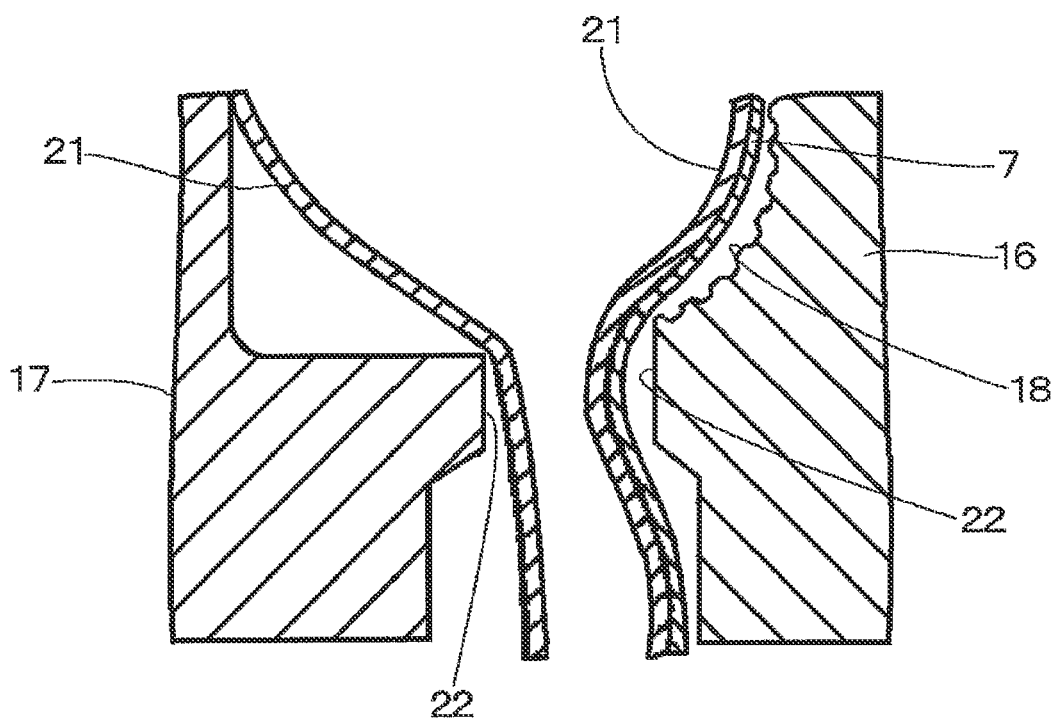
FIG. 10 is a partially enlarged sectional view of FIG. 9.
Figure 11:
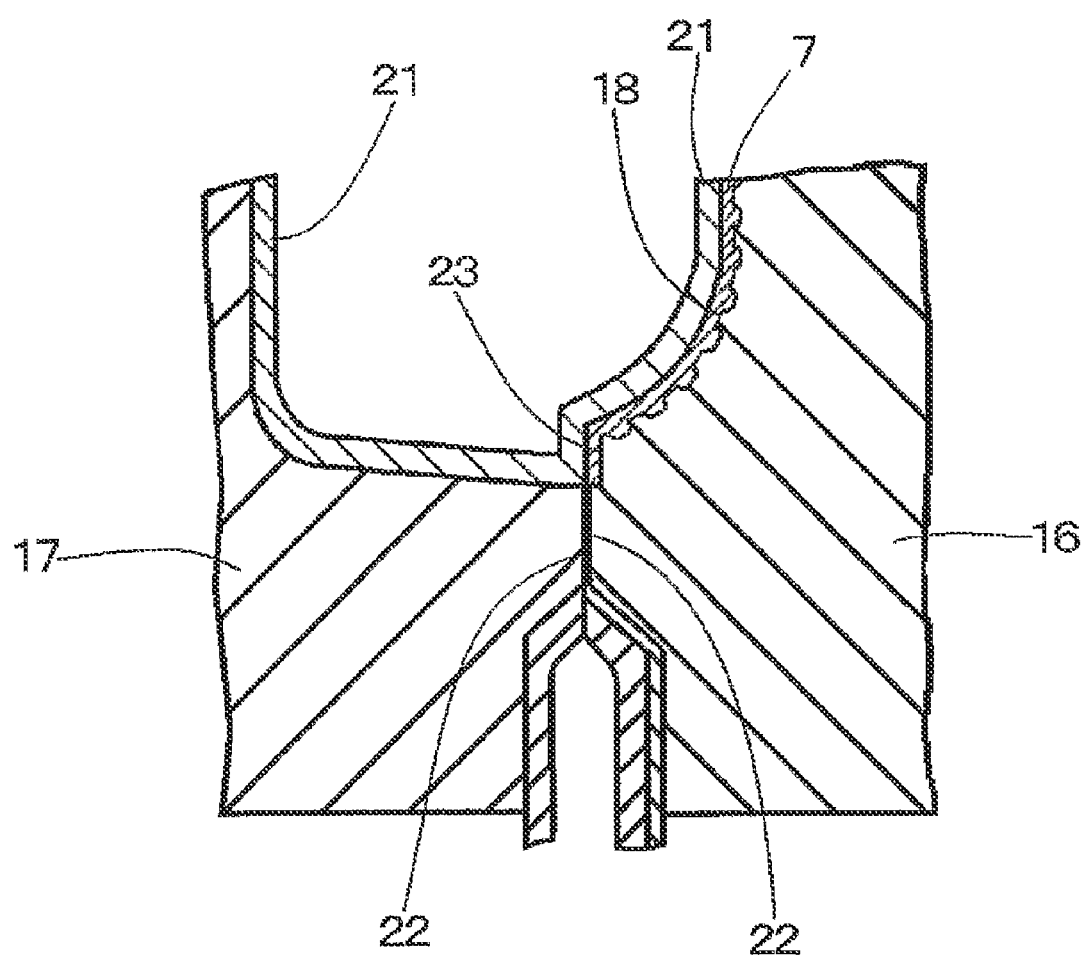
FIG. 11 is a partially enlarged sectional view showing a mode in which blow molding is finished after clamping.

The vehicle interior panel 1 according to the invention is blow-molded by the laminating blow molding method shown in FIGS. 9 to 11. FIG. 9 is a sectional view showing a blow molding mode of a blow molded component with skin, FIG. 10 is a partially enlarged sectional view of FIG. 9, and FIG. 11 is a partially enlarged sectional view showing a mode in which the blow molding is finished after clamping.

In FIGS. 9 to 11, the reference numerals 16 and 17 designate a pair of mold halves, a cavity of the mold 16 has a three-dimensional transfer surface 18 which transfers the three-dimensional pattern 8 formed on the surface of the cover material 7. Slide cores 19 which form the double-walled ribs 6 are provided on the mold 17. The reference numeral 20 designates an extruding head, and the reference numeral 21 designates a parison.

When the blow molding of the vehicle interior panel 1 is performed, the mold halves 16 and 17 are opened, and the cover material 7 is placed between the parison 21 and the cavity of the mold 16 while the parison 21 is arranged between the mold halves 16 and 17. In the cover material 7 arranged between the mold halves 16 and 17, a non-woven fabric is placed on the surface facing the parison 21.

The cover material 7, arranged between the parison 21 and the cavity of the mold 16 having the three-dimensional transfer surface in the pair of mold halves 16 and 17, has a double-layer structure in which the non-woven fabric is bonded to the resin sheet. The resin sheet made of the thermoplastic resin has no through hole, and the resin sheet does not substantially have air permeability. In the thermoplastic resin, the average thickness is no more than 2.0 mm, tensile modulus is 500 kg/cm$^2$ at 100° C., and the tensile strength at yield point is no more than 50 kg/cm$^2$ at 100° C. In the non-woven fabric, the weight per area is no more than 250 g/cm$^3$.

The slide cores 19 provided on the mold 17 intrude while the mold halves 16 and 17 are clamped, parts of the parison 21 pushed out by the slide cores 19 are welded by coming into contact with each other. Then, the pressurized fluid is introduced into the parison 21 while the slide cores 19 are retracted to the cavity of the mold 17, the cover material 7 is pressed against the cavity of the mold 16 to transfer the three-dimensional pattern 8 corresponding to the three-dimensional transfer surface to the surface of the cover material 7 by expanding the parison. In the portions protruded by the slide cores 19, the wall surfaces are welded to each other to form the double-walled rib 6 having the integral plate-like structure between the first wall 2 and the second wall 3.

That is, in the vehicle interior panel 1, the flat resin sheet having no substantial not-flat pattern in which the non-woven fabrics whose weight per areas are no more than 250 g/m$^2$ are laminated is arranged between the parison 21 and the mold halves 16 and 17, the parison 21 and the cover material 7 which are in the melting state are integrally laminated by the blow molding, and the integrally laminated parison 21 and cover material 7 are pressed against the mold half 16 on which the three-dimensional transfer surface 18 is formed on the cavity, which transfers three-dimensional pattern 8 including the hemispherical protrusion, the projection, the recess, the projection and recess, or the embossing shape to the surface of the resin sheet. Therefore, the vehicle interior panel 1 in which the protruding three-dimensional pattern having the height ranging from 200 to 2500 μm is preferably formed by the three-dimensional transfer surface 18 provided in the cavity of the mold half 16 can be obtained, even if the resin sheet 7 is prolonged while blow molding.

Three-dimensional transfer surface 18 formed in the cavity of the mold half 16 is one in which the recesses are formed by machining or etching the cavity surface. While blow molding, the resin sheet is integrally laminated to the parison 21, and the shape corresponding to the recesses is transferred to the surface of the resin sheet by pressing the resin sheet against the cavity surface. Therefore, the blow molding component 1 with skin having the protruding three-dimensional pattern can be obtained. At this point, the three-dimensional transfer surface 18 is formed in at least a part of the cavity, however, it is preferable that the regularly arrayed recesses are provided in the whole surface of the cavity.

The cavity of the mold 16 in the pair of mold halves 16 and 17 has a step forming portion 23 on the whole circumference along a pinch-off forming portion 23. In the pinch-off forming portion 23, the end of the cover material 7 is integrally fixed to the parison 21 by pressing the end of the cover material 7 against the parison 21.

The cover material 7 is arranged between the parison 21 and the cavity of the mold 16 in the pair of mold halves 16 and 17, and it is desirable that the clamping is performed without softening the cover material 7 by the heating process from the viewpoint of shortening the molding cycle. After the parison 21 drops vertically between the mold halves, it is preferable that a pre-pressurized fluid is introduced into the parison by pre-blow before the clamping from the viewpoint of molding.

The vehicle interior panel 1 is produced by the so-called direct blow molding, in which the tubular parison 21 extruded by the extruding head 20 is used, as an example of the method of producing the vehicle interior panel 1. Alternatively, the vehicle interior panel 1 can also preferably be molded by the so-called sheet blow molding in which a previously molded olefin resin sheet is arranged between the molds and the blow molding is performed by heating and melting the resin sheet, and the vehicle inner panel 1 can also be preferably molded by the method in which the melt-extruded sheet-like parison is used. In the case where the vehicle interior panel 1 is formed by the sheet blow molding, the cover material can previously be laminated to the olefin resin sheet or the like.

A method of producing the vehicle interior panel shown in FIGS. 5 to 7 according to another embodiment of the invention will be described below with reference to FIG. 12. However, the same mode as FIGS. 9 to 11 is designated by the same reference numeral, and the description of the same mode will not be repeated.

Figure 12:
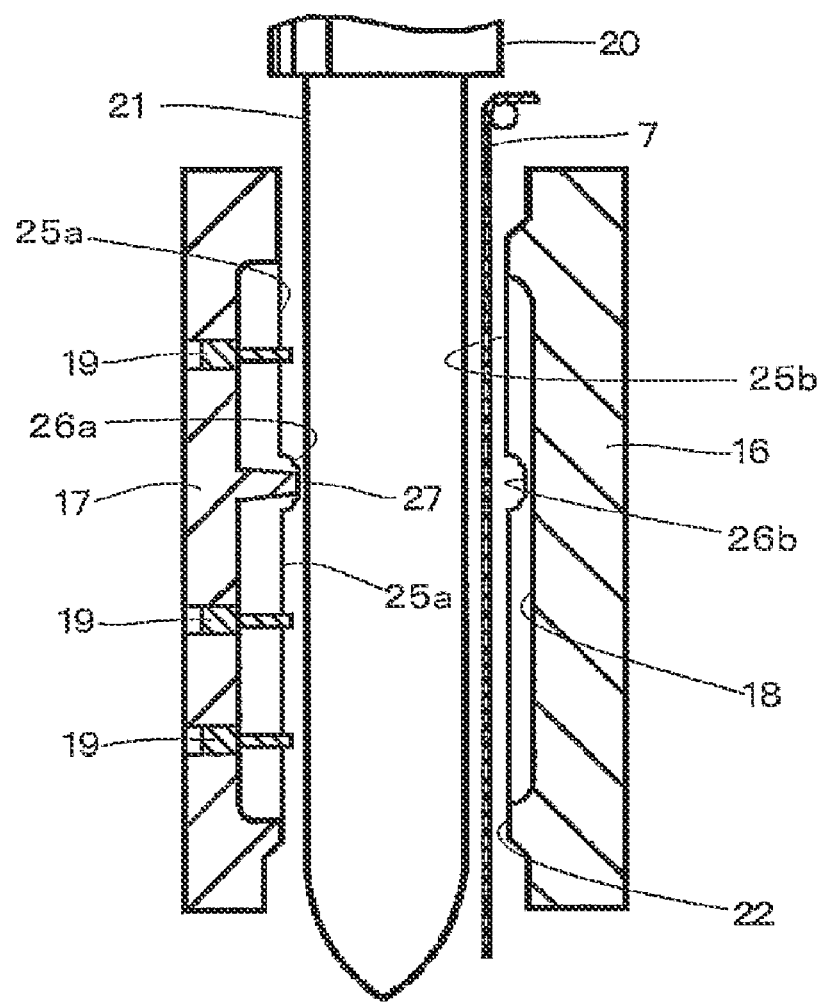
FIG. 12 is a sectional view showing a blow molding mode of a vehicle interior panel according to another embodiment of the invention.

FIG. 12 is a sectional view showing a vehicle interior panel blow molding mode according to another embodiment of the invention.

A hinge forming portion 27 is provided in the cavity of the mold 17, and the cavity of the mold 17 has a parting surface including a substantially linear pinch-off forming portion 25a and a pinch-off forming portion 26a projected from the cavity surface near the hinge forming portion. On the other hand, the cavity of the mold 16 has the parting surface including a substantially linear pinch-off forming portion 25b and a pinch-off forming portion 26b corresponding to the projected pinch-off forming portion.

When the blow molding of the vehicle interior panel 1 is performed, the cover material 7 is arranged between the parison 21 and the mold 16, and the mold halves 16 and 17 are clamped to form the parting line 9 corresponding to the parting surface. Then, parts of the parison are welded to each other by the hinge forming portion 27 provided in the mold 17, and the pressurized fluid is introduced into the parison to form the hinge portion 24 separating the hollow spaces in the substantially same surface as the first wall 2 by the blow pressure.

According to this embodiment, on the peripheral wall 5 connecting the first wall 2 and the second wall 3 of the panel having the hollow double-walled structure, the parting line 9 including the portion 9b close to the side of the first wall 2 is formed near the substantially linear portion 9a and the hinge portion 24, and the end of the cover material 7 is laminated along the parting line 9 formed on the peripheral wall 5. Therefore, the substantially flat surface can be obtained on the first wall 2 while the unnecessary recesses are not formed on the first wall 2, and the peeling is not generated because the end of the cover material is strongly fixed. The step portion 10 is provided in the parting line 9, which allows the cover material 7 to be strongly fixed without generating wrinkle or breakage caused by the excessive elongation at the end of the cover material 7. Because the parting surfaces of the mold half forming the parting line 9 is formed at the positions close to the side of the first wall 2 by winding the parting line of the mold at the position corresponding to the hinge portion 24, the end of the cover material 7 is strongly fixed, and the sheet peeling caused by the motion of the hinge portion is prevented. Further, since the first wall 2 is substantially formed in flat, even if the three-dimensional pattern 8 is transferred to the surface of the cover material 7, the transfer unevenness is not generated, and the vehicle interior panel 1 having the good appearance can be obtained.

INDUSTRIAL APPLICABILITY

The invention relates to the blow-molded panel with skin which is used as the vehicle interior panel, the method of producing the panel with skin, and the laminating blow molding method. The panel with skin is the vehicle interior panel used for the lid panel and shelf board of the luggage compartment of the automobile such as the floor panel, the luggage board, and the shelf panel, and the panel with skin is the panel having the hollow double-walled structure in which the cover material is integrally laminated by the blow molding.

What is claimed is:

1. A method of producing a vehicle interior panel having a hollow double-walled structure made of thermoplastic comprising:

blow molding with a pair of mold halves including a first mold half with a shape transfer surface having a three dimensional pattern, and a second mold half, clamping a cover material being formed by at least a double-layer structure arranged between a cavity of said first mold half and a parison of thermoplastic such that a resin sheet layer without a through hole and without a three dimensional pattern faces a cavity of said first mold half, said cavity having a shape transfer surface with a three dimensional pattern, bonding a non-woven fabric layer whose weight per area is no more than 250 g/cm² to the parison introducing a pressurized fluid into the parison to press the cover material and the parison against a cavity surface, thereby integrally laminating said cover material having an average thickness of the cover material being not more than 2.0 mm (0.078 in), tensile modulus of the cover material being lower than 500 kg/cm² (7.11 ksi) at 100° C. (212° F.), a tensile strength at yield point of the cover material being not more than 50 kg/cm² (0.711 ksi) at 100 ° C. (212° F.) to an outer surface of a first wall of the panel having the hollow double-walled structure and transferring said three dimensional pattern of said first mold half to said resin sheet layer such that said three dimensional pattern is a plurality of protrusions disposed in a pattern impressed upon a surface of said resin sheet layer said protrusions having heights ranging from 0.5 - 2.5 mm (0.02-0.09 in) wherein an average thickness (a) of the vehicle interior panel is formed no more than 25.0 mm (0.98 in) and, the parting line is formed at a position located within a 35% range (b) of the average thickness of the panel from the surface of the first wall, and the parting line is formed within the range in which the average thickness is no more than 8.0 mm (0.315 in) from the surface of the first wall.

2. A vehicle interior panel producing method according to claim 1, wherein pinch-off forming portions forming a boundary between said cavities are provided in said first mold half and said second mold half, the parison and the cover material are sandwiched by arranging the parison and the cover material between the mold halves to perform the clamping, a blowing pin is stuck into the parison near the pinch-off forming portions to introduce the pressurized fluid in the parison, a parting line corresponding to the pinch-off forming portions is formed, an end of the cover material is integrally laminated along the parting line over an entire circumference of a peripheral wall of the vehicle interior panel.

3. A vehicle interior panel producing method according to claim 2, wherein a step-portion forming portion is provided along the pinch-off forming portion over the entire circumference of the cavity in the first mold half, the end of the cover material is integrally fixed by pressing the end of the cover material against the parison in the step-portion forming portion, and thereby the end of the cover material is laminated along a step portion formed on the peripheral wall of the vehicle interior panel.

4. A vehicle interior panel producing method according to claim 1, wherein a slide core is provided in the cavity of the other mold while being retractable to a cavity surface, after a part of the parison is integrally welded by the slide core projected from the cavity surface, the slide core is retracted to the cavity of the second mold half, and the pressurized fluid is introduced into the parison to form a double-plate-like double-walled rib in which side faces are welded to each other between the first wall and a second wall by blow pressure.

5. A vehicle interior panel producing method according to claim 1, wherein a hinge forming portion is provided on the cavity of the second mold half, the cavity of second mold half has a parting surface including a linear pinch-off forming portion and a pinch-off forming portion projected from the cavity surface near the hinge forming portion, the cavity of the first mold half has the parting surface including a linear pinch-off forming portion and a pinch-off forming portion corresponding to said projected pinch-off forming portion, the cover material is arranged between the parison and the first mold half, the first and second mold halves are clamped to form the parting line corresponding to said parting surface, parts of the parison are integrally welded by the hinge forming portion provided in the second mold half, and the pressurized fluid is introduced into the parison to form a hinge portion separating hollow spaces in the same surface as the first wall by the blow pressure.

6. A vehicle interior panel producing method according to claim 1, wherein a three-dimensional shape transfer surface is formed on at least the first mold half, the parison is arranged between said mold halves, the flat cover material having no three-dimensional pattern is arranged between the parison and the cavity in which said three-dimensional shape transfer surface is formed such that the resin sheet faces the cavity, the mold halves are closed to introduce the pressurized fluid into the parison, the cover material is pressed against the cavity of the first mold half to laminate the cover material to the parison, and the three-dimensional pattern corresponding to said three-dimensional shape transfer surface is transferred to the surface of the cover material.

7. A vehicle interior panel producing method according to claim 6, wherein the three-dimensional shape transfer surface has a grain pattern or a plurality of recesses whose depths from the cavity surface range from 0.5 to 2.5 mm (0.02-0.09 in).

8. A vehicle interior panel producing method according to claim 6, wherein the cover material is arranged between the parison and the cavity of either of the first or second mold halves, and clamping is performed without softening the cover material by a heating process.

* * * * *